United States Patent
Buer et al.

(10) Patent No.: US 6,295,282 B1
(45) Date of Patent: Sep. 25, 2001

(54) CALIBRATED LOW LOSS RADIO FREQUENCY SWITCH MATRIX

(75) Inventors: Kenneth Vern Buer; David Warren Corman; Joel Lloyd Gross, all of Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/127,935

(22) Filed: Aug. 3, 1998

(51) Int. Cl.[7] .................... H04G 7/212; H04L 12/50; H04Q 19/00
(52) U.S. Cl. .................. 370/323; 370/360; 340/825.79
(58) Field of Search ......................... 370/343, 386, 370/355, 357, 360, 315, 316, 323; 340/825.79, 825.85; 330/295, 124 R; 307/113, 112, 147, 327, 326; 455/12.1, 13.2, 427

(56) References Cited

U.S. PATENT DOCUMENTS

| | | | |
|---|---|---|---|
| 4,430,732 | * 2/1984 | Saga et al. | 370/54 |
| 4,456,988 | * 6/1984 | Nakagome et al. | 370/75 |
| 4,858,225 | * 8/1989 | deSantis | 370/50 |
| 5,430,443 | * 7/1995 | Mitchell | 341/22 |
| 5,757,941 | * 5/1998 | McMillen | 381/119 |
| 5,932,936 | * 8/1999 | Potthast et al. | 307/113 |

* cited by examiner

Primary Examiner—Hassan Kizou
Assistant Examiner—Duc Ho
(74) Attorney, Agent, or Firm—Jeff D. Limon; Frank J. Bogacz

(57) ABSTRACT

A system for switching radio frequency signals from an input side (5, FIG. 1 ) to an output side (6) can be used to combine multiple input signals to form a single output and to distribute a single input signal to form multiple outputs. Gain correction amplifiers (20, 25) are employed to adjust the overall gain of a particular column and row of the switch matrix which minimizes the effect of variations in the gain of the amplified switching elements (30) which perform the switching function. Resistive matching units (70, FIG. 2) provide coupling to and from the amplified switching elements (30) without substantially changing the characteristic impedance of the input and output paths.

23 Claims, 2 Drawing Sheets

CALIBRATED LOW LOSS RADIO FREQUENCY SWITCH MATRIX

FIELD OF THE INVENTION

The invention relates generally to the field of radio frequency electronics and, more particularly, to a calibrated low loss radio frequency switch matrix.

BACKGROUND OF THE INVENTION

In a communication system which employs multiple satellite antennas which project communication beams onto the surface of the earth, a group of receive antenna beams must be switched or routed from receiving antennas to one or more available tuners. These tuners downconvert the signals from the receiving antennas in order to extract the information conveyed by the received signals. This information can represent analog or digitized voice, analog or digitized video, facsimile data, and so on. In some communication satellite architectures, as many as 50 or 100 antenna beams must be simultaneously routed to one or many tuners. Therefore, because of the requirements of the satellite system to switch between tuners and antenna beams, switch matrices are employed to perform this function. Generally, these switching matrices must operate at radio frequencies and higher.

Radio frequency switch matrices are generally embodied as large three-dimensional structures. Crossbar switches may be used at higher frequencies, but can be rendered less effective due to the need for directional couplers used to multiplex signals from one or more input pathways to one or more output pathways. Additionally, at some frequencies (such as below 3.0 GHz) their use may be impractical due to the large volume required to implement a directional coupler which operates in this frequency range. The problem is compounded in that multiple switch matrices are often required in order to meet the capacity needs of the particular communication system.

Additionally, future communication systems will demand that switch matrices be calibrated to within one dB of the desired gain in order to maintain transmit and receive beam-to-beam isolation requirements. With current radio frequency technology, it is impractical to manually align or to expect manufacturing tolerances of one dB in large switch matrices. Further, maintaining a flat frequency response over a large bandwidth can dramatically increase the cost and complexity of a radio frequency crossbar switch used in either transmit or receive communications modules.

Therefore, what is needed is an inexpensive radio frequency switch matrix capable of operating over a wide bandwidth which provides a multiplexing function without requiring a large amount of weight and power. What is also needed, is a radio frequency switch matrix that can be quickly and automatically calibrated with a minimum number of calibration coefficients.

DESCRIPTION OF THE PREFERRED EMBODIMENTS

A radio frequency crossbar switch matrix provides efficient switching of multiple beam inputs to one or more outputs. Additionally, the use of resistive taps for coupling to input pathways as well as output pathways ensures that input and output impedances can be maintained at the characteristic impedance of the system (such as 50 or 75 Ohms). Further, the use of amplified switching elements allows the switching function to be performed in a low loss manner. An additional benefit is realized by using gain correction amplifiers on the input and output sides of the radio frequency crossbar switch matrix. The use of gain correction amplifiers enables the various output ports of the switch matrix to provide output signals which are substantially equal in magnitude.

Figure 1:
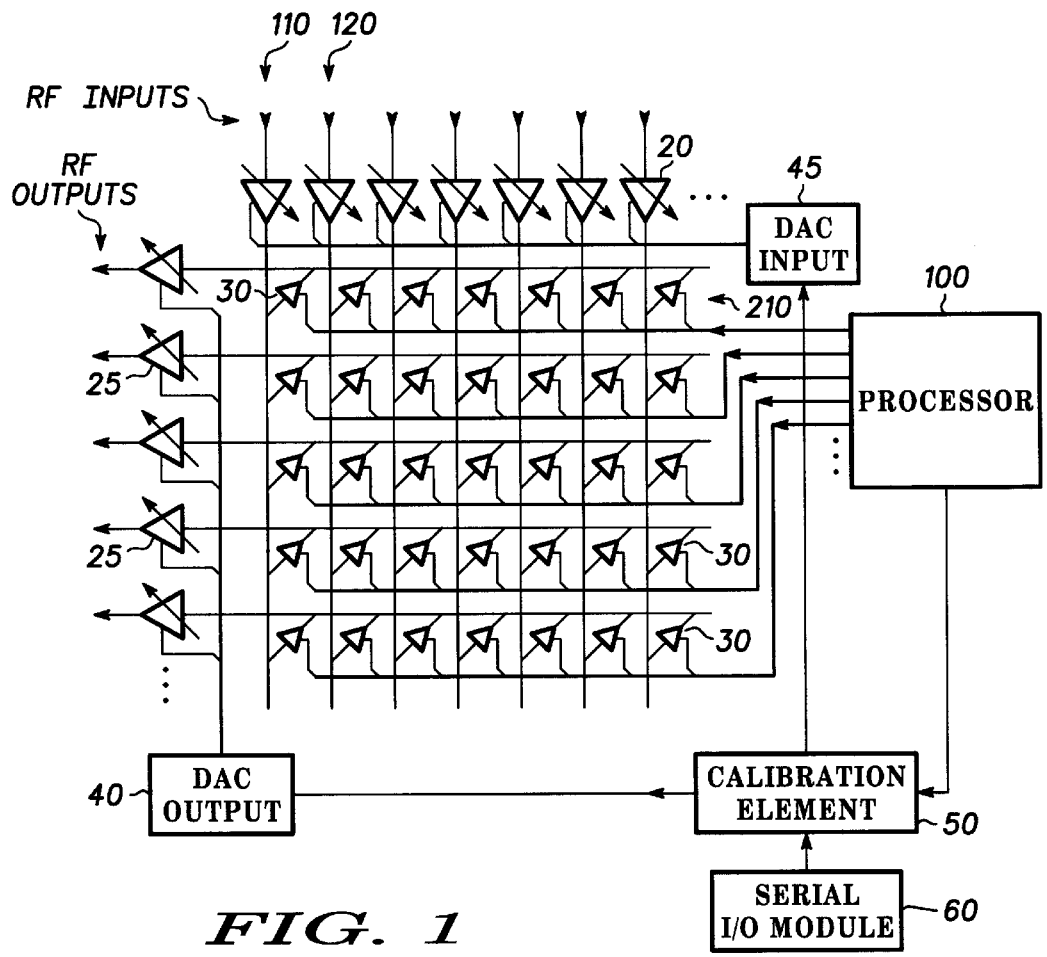
FIG. 1 illustrates a system for switching a plurality of radio frequency signals in accordance with a preferred embodiment of the invention.
Figure 2:
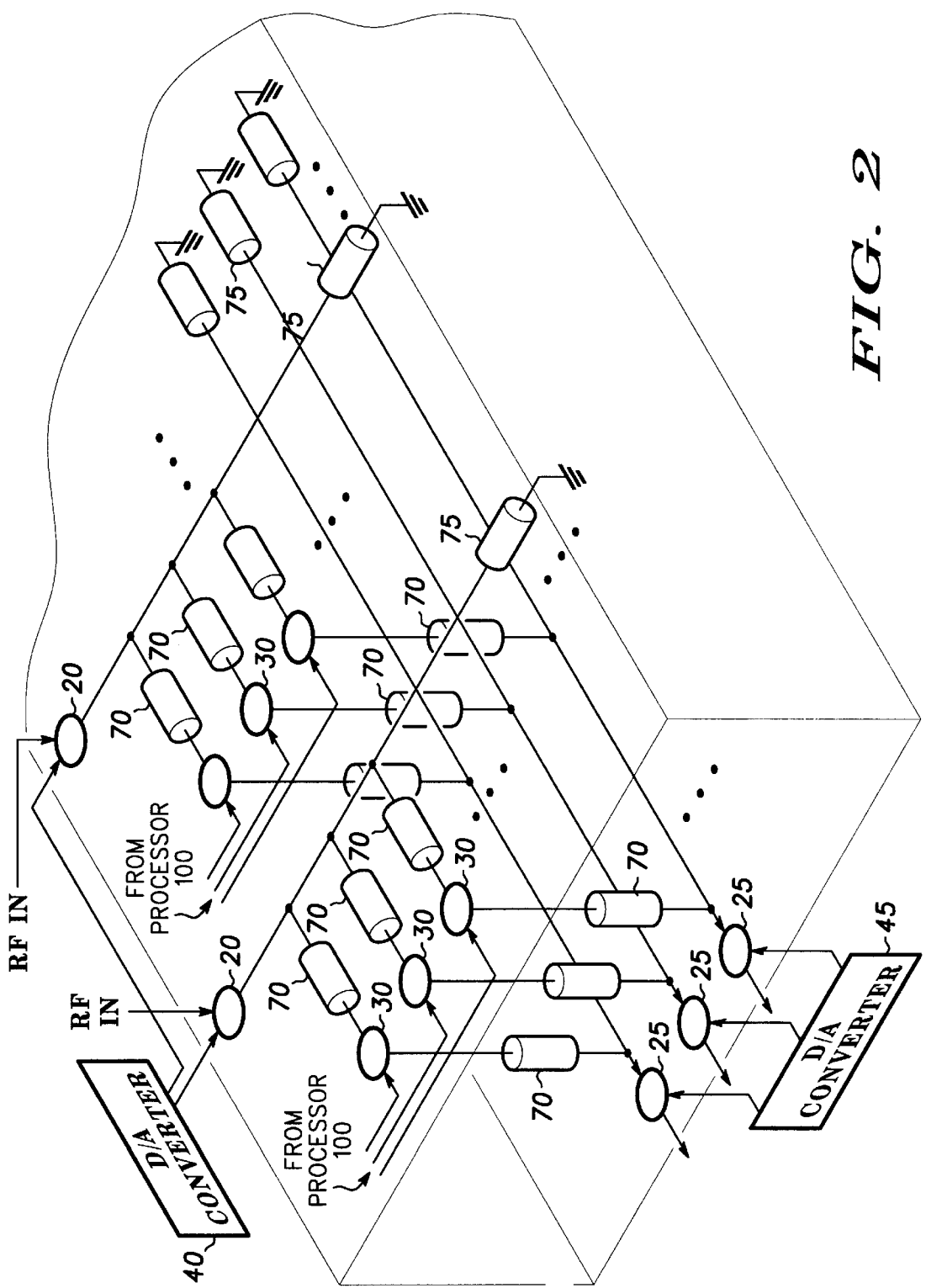
FIG. 2 illustrates an isometric view of a system for switching a plurality of radio frequency signals in accordance with a preferred embodiment of the invention.

FIG. 1 illustrates a system for switching a plurality of radio frequency signals in accordance with a preferred embodiment of the invention. The illustration of FIG. 1 shows a two-dimensional switching matrix, while the isometric view of FIG. 2 illustrates more of the details of the actual structure of the system described herein. In FIG. 1, a plurality of radio frequency signals are coupled to a column of amplified switching elements 30 through input gain correction amplifiers 20.

Although FIG. 1 shows the output of each gain correction amplifier as being coupled to a particular column of amplified switching elements 30, this is not intended to be limiting in any way. The output of input gain correction amplifier 20 can be coupled to any one of a plurality of arrangements in a succession of arrangements of amplified switching elements 30 oriented in a particular dimension. Similarly, although the output pathways are shown as rows in FIG. 1, this is also not intended to be a limitation.

Output gain correction amplifier 25 can be coupled to any one of a second plurality of arrangements in a second succession of arrangements in another dimension of amplified switching elements 30. The system for switching a plurality of radio frequency signals described in FIG. 1 can be part of the electronics package of an orbiting communications node such as a communications satellite which provides communications with a plurality of earth-based subscriber units.

In a preferred embodiment, the coupling pathways which convey radio frequency signals to and from the system of FIG. 1 are transmission lines of a characteristic impedance, such as 50 or 75 Ohms. According to the specific frequency requirements of the particular application, these transmission lines can be realized by way of coaxial cable, microstrip, stripline, or other conventional structure known to those skilled in the art.

Radio frequency signals from an output of each gain correction amplifier 20 are coupled to each amplified switching element 30 in column 110 of the system of FIG. 1. The output of each amplified switching element 30 in column 110 is coupled to a particular row, such as row 210, in accordance with the location of each amplified switching element 30 according to commands from processor 100. Processor 100 controls the ON/OFF state of each amplified switching element 30 of column 110 which enables the signal to be present on any one or several rows of the system of FIG. 1. Through this control from processor 100, signals can be distributed from a single input pathway to a plurality of output pathways.

Additionally, processor 100 can enable a plurality of input pathways to be combined or multiplexed onto a single output pathway.

Amplified switching elements 30 can comprise any general purpose amplifier, such as a transistor amplifier known to those skilled in the art. In a preferred embodiment, amplified switching elements 30 comprise field effect transistors having a silicon, gallium arsenide, or other type of substrate. Those skilled in the art can envision numerous other suitable transistor types. Although not shown in FIG. 1, each amplified switching element 30 is coupled to resistive elements at both a signal input and output. The advantages of the use of resistive matching units are discussed in detail with reference to FIG. 3.

In an alternate embodiment, micro-electromechanical switches are used in lieu of amplified switching elements 30. Micro-electromechanical switches provide switching capabilities similar to those provided by amplified switching elements 30 but do not provide gain. The use of micro-electromechanical switches can be desirable since they provide a low cost, micro-machined alternative to amplified switch elements 30. Additionally, the use of micro-electromechanical switches can result in fewer parasitic capacitances and thus even greater bandwidth than that offered by conventional transistor amplifiers.

In a preferred embodiment, outputs from each amplified switching element 30 of a particular row are coupled to an output pathway of output gain correction amplifiers 25. The gain of each output gain correction amplifier 25, as well as the gain of each input gain correction amplifier 20 is controlled by way of digital to analog converters 40 and 45.

Input digital to analog converter 45 functions to convert a digital signal accepted from calibration element 50 into a series of analog voltages. These analog voltages are conveyed to each of input gain correction amplifiers 20 to provide control over the gain of these amplifiers. In a similar manner, calibration element 50 also conveys a digital signal to output digital to analog converter 40. Output digital to analog converter 40 conveys an analog signal to each of output gain correction amplifiers 25, thus providing control over the gain of these amplifiers.

The use of gain correction amplifiers 20 and 25 minimizes the effect of variations in the gain of individual amplified switching elements 30 on power coupled to the outputs of the switch matrix. In a system where variations among individual amplified switching elements 30 are as much as 3 dB, it is expected that the use of gain correction amplifiers 20 and 25 can reduce this to approximately 0.5 dB. Additionally, this level of control can be achieved using a number of gain correction amplifiers equal to the sum of the number of columns (M) and rows (N) of the system (M+N). This represents a significant improvement over systems which employ gain correction amplifiers at each switching element. For systems such as these, the number of gain correction amplifiers is approximately equal to M×N. In a preferred embodiment, input and output gain correction amplifiers and 25 are dual gate field effect transistors which allow for control over the gain through an analog voltage control signal.

Calibration element 50, which provides calibration coefficients for digital to analog converters 40 and 45, is controlled through serial input/output module 60. Serial input/output module 60 functions to control the gain parameters of calibration element 50. This allows input gain correction amplifiers 20 and output gain correction amplifiers 25 to be adjusted in response to changes such as temperature or failure of gain producing or gain control components in other areas of the communication system. Calibration element 50 can also receive the calibration coefficients for each input gain correction amplifier 20 and each output gain correction amplifier 25 from processor 100. Thus, as a function of the ON/OFF state of each amplified switching element, gain parameters for each input gain correction amplifier 20 and each output gain correction amplifier 25 can be dynamically adjusted.

FIG. 2 illustrates an isometric view of a system for switching a plurality of radio frequency signals in accordance with a preferred embodiment of the invention. In FIG. 2, radio frequency signals are coupled to one of a plurality of input gain correction amplifiers 20. As mentioned in reference to FIG. 1, input gain correction amplifiers 20 function to adjust the gain of the radio frequency signal present at the input to the switch matrix prior to being coupled to one of resistive matching units 70. The output of each resistive matching unit 70 is coupled to one of amplified switching elements 30.

Responsive to control inputs from processor 100, which controls the ON/OFF state of each amplified switching element 30, the radio frequency signal is either routed through the particular amplified switching element 30, or reflected back through the particular resistive matching unit 70 when the signal encounters the open circuit (as will be the case when the element has been switch to the OFF state). For the case of those amplified switching elements 30 which are switched to the ON state, the amplified signal at the output is coupled to a second resistive matching element 40, and conveyed to one of output gain correction amplifiers 25. The particular output gain correction amplifier 25 can also amplify outputs from other output resistive matching which correspond to those amplified switching elements 30 in the same row which have been switched to the ON state by processor 100. In this manner, radio frequency signals from several columns of amplified switching elements 30 can be multiplexed or combined onto a single output.

In a preferred embodiment, each output path from input gain correction amplifiers 20 is a transmission line which is desirably terminated in a characteristic impedance, such as 50 Ohms. This impedance matching ensures that maximum power is coupled from input gain correction amplifier 20 to each of resistive matching units 70. Additionally, each pathway which couples radio frequency signals to output gain correction amplifiers 25 is desirably also a transmission line and is terminated in a characteristic impedance, such as 50 Ohms. This impedance matching ensures that maximum power is coupled from resistive matching unit 70 to each output gain correction amplifier 25.

Figure 3:
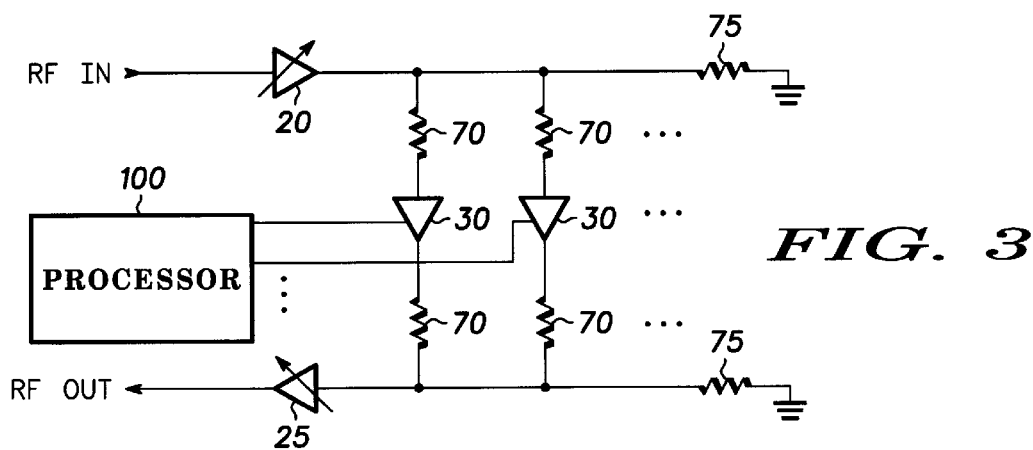
FIG. 3 illustrates a detailed schematic diagram of a portion of a system for switching a plurality of radio frequency signals in accordance with a preferred embodiment of the invention.

FIG. 3 illustrates a detailed schematic diagram of a portion of a system for switching a plurality of radio frequency signals in accordance with a preferred embodiment of the invention. The input and output sides of FIG. 3 correspond to a column and row, respectively, of the switch matrix of FIG. 1. In FIG. 3, input radio frequency signal is first incident on input gain correction amplifier 20. Input gain correction amplifier 20 functions to adjust the magnitude of the radio frequency signal prior to distributing the signal to resistive matching units 70.

In a preferred embodiment, terminating resistor 75 provides a terminating load impedance to a transmission line input pathway. From the diagram of FIG. 3, it can be appreciated that a large number of resistive matching units 70 can be present without affecting the input impedance of the switch matrix. As an example, if the value of each resistive matching unit 70 is 5 KOhm, then a total of 100 such resistive matching units 70 can be combined in the manner of FIG. 3 to present a 50 Ohm load to the output of input gain correction amplifier 20.

Similarly, the use of this resistance value for resistive matching unit 70 at the output of each amplified switching element 30 would present a 50 Ohm load to the input of output gain correction amplifier 25. For this example, terminating resistors 75 need not be used. However, when the number of resistive matching units 70 is a smaller number, such as 10–20, terminating resistors 75 should be used.

A system for efficient radio frequency switching facilitates multiplexing a single input to multiple outputs. In a similar manner, multiple inputs can be combined or multiplexed onto a single output line. The use of gain correction amplifiers 30 in each row and column of the switch matrix allows flexibility in the overall gain of the switch matrix system without requiring gain correction of each individual element. The resulting switch matrix can be less expensive, less complex, and thus desirable over conventional radio frequency switching techniques.

Accordingly, it is intended by the appended claims to cover all modifications of the invention that fall within the true spirit and scope of the invention.

What is claimed is:

1. A system for switching a plurality of radio frequency signals between a plurality of input pathways and a plurality of output pathways, said system comprising:

a plurality of input pathways with each being coupled to one of a plurality of arrangements in a first succession of amplified switching elements;

a plurality of output pathways with each being coupled to one of a plurality of arrangements in a second succession of amplified switching elements; and a processor coupled to said pluralities of arrangements in said first and said second succession of said amplified switching elements for controlling routing of said plurality of radio frequency signals between said plurality of input pathways and said plurality of output pathways.

2. The system of claim 1 further comprising a gain correction amplifier coupled to each of said plurality of input pathways.

3. The system of claim 2 wherein said gain correction amplifier is a dual gate junction field effect transistor.

4. The system of claim 2 wherein said system further comprises a digital to analog converter which accepts an input from a processor and outputs a control signal to said gain correction amplifier.

5. The system of claim 1 wherein said plurality of arrangements in a first succession comprises a plurality of rows in a first dimension.

6. The system of claim 1, wherein said plurality of arrangements in a second succession comprises a plurality of columns in a second dimension.

7. The system of claim 1 further comprising a gain correction amplifier coupled to each output pathway.

8. The system of claim 7 wherein said gain correction amplifier is a dual gate junction field effect transistor.

9. The system of claim 7 wherein said system further comprises a digital to analog converter which accepts an input from a calibration element and outputs a control signal to said gain correction amplifier.

10. The system of claim 1 wherein said processor routes one of said plurality of radio frequency signals from an input pathway of said plurality of input pathways to said plurality of output pathways.

11. The system of claim 1 wherein said processor routes one of said plurality of radio frequency signals from said plurality of input pathways to one of said plurality of output pathways.

12. A system for switching a plurality of radio frequency signals between a plurality of input pathways and a plurality of output pathways, said system comprising:

a plurality of input pathways with each being coupled to one of a plurality of arrangements in a first succession of micro-electromechanical switches;

a plurality of output pathways with each being coupled to one of a plurality of arrangements in a second succession of micro-electromechanical switches; and a processor coupled to said plurality of first and second successions of micro-electromechanical switches for controlling routing of said plurality of radio frequency signals between said plurality of input pathways and said plurality of output pathways.

13. The system of claim 12 further comprising a gain correction amplifier coupled to each of said plurality of input pathways.

14. The system of claim 13 wherein said gain correction amplifier is a dual gate junction field effect transistor.

15. The system of claim 13 wherein said system further comprises a digital to analog converter which accepts an input from a calibration element and outputs a control signal to said gain correction amplifier.

16. The system of claim 13 further comprising a gain correction amplifier coupled to each of said plurality of output pathways.

17. The system of claim 13 wherein said gain correction amplifier is a dual gate junction field effect transistor.

18. The system of claim 13 wherein said system further comprises a digital to analog converter which accepts an input from a processor and outputs a control signal to said gain correction amplifier.

19. A radio frequency crossbar switch for switching radio frequency signals from a plurality of input pathways to a plurality of output pathways in a communications node, said communications node providing communications with a plurality of subscriber units, said radio frequency crossbar switch comprising:

a plurality of input pathways with each being coupled to one of a plurality of arrangements in a first succession of amplified switching elements through a transmission line;

a plurality of output pathways with each being coupled to one of a plurality of arrangements in a second succession of amplified switching elements through a transmission line; and a processor coupled to said plurality of first and second successions of amplified switching elements for controlling routing of radio frequency signals between said plurality of input pathways and said plurality of output pathways.

20. The radio frequency crossbar switch of claim 19, wherein said plurality of input pathways comprise resistive elements which attenuate said radio frequency signals.

21. The radio frequency crossbar switch of claim 19, wherein said plurality of output pathways comprise resistive elements which attenuate said radio frequency signals.

22. The radio frequency crossbar switch of claim 19 further comprising a gain correction amplifier coupled to each of said plurality of input pathways.

23. The radio frequency crossbar switch of claim 19 further comprising a gain correction amplifier coupled to each of said plurality of output pathways.

* * * * *